March 17, 1953  G. AINSWORTH  2,631,703
TRANSMISSION OPERATING MECHANISM
Filed Oct. 24, 1945  6 Sheets-Sheet 1

INVENTOR.
GEORGE AINSWORTH
BY
H.V. Clayton
ATTORNEY

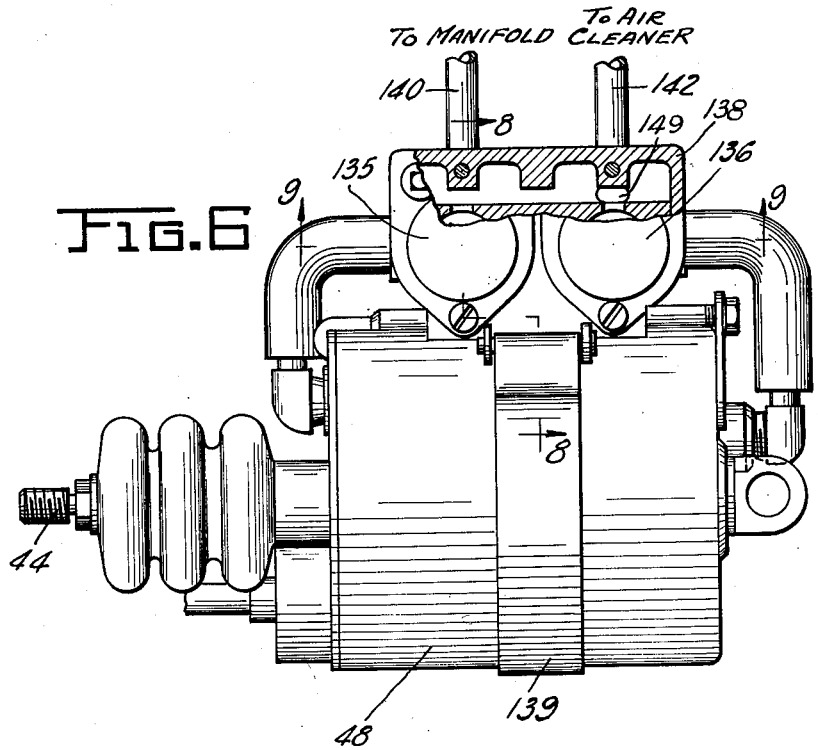
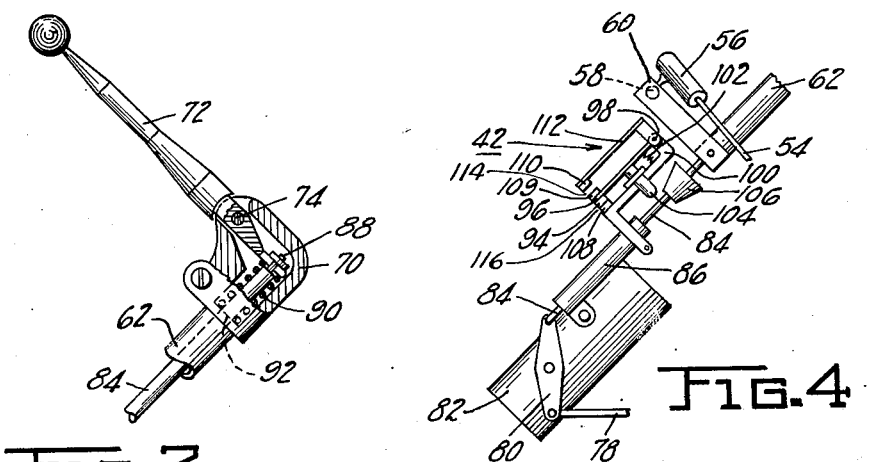

Inventor
GEORGE AINSWORTH
By H. O. Clayton
Attorney

March 17, 1953 G. AINSWORTH 2,631,703
TRANSMISSION OPERATING MECHANISM
Filed Oct. 24, 1945 6 Sheets-Sheet 4
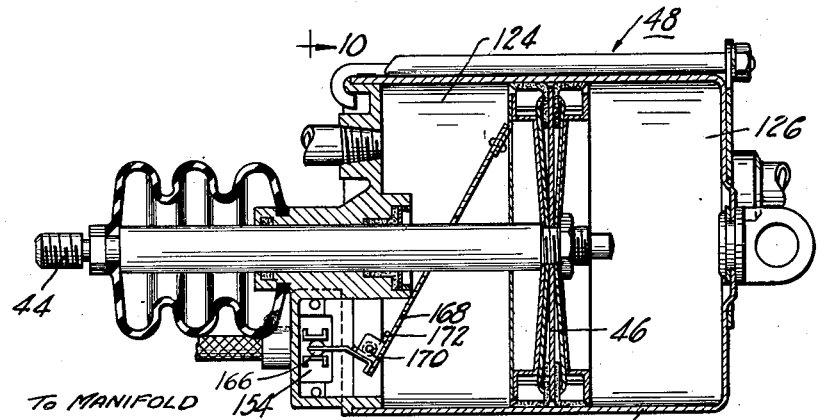
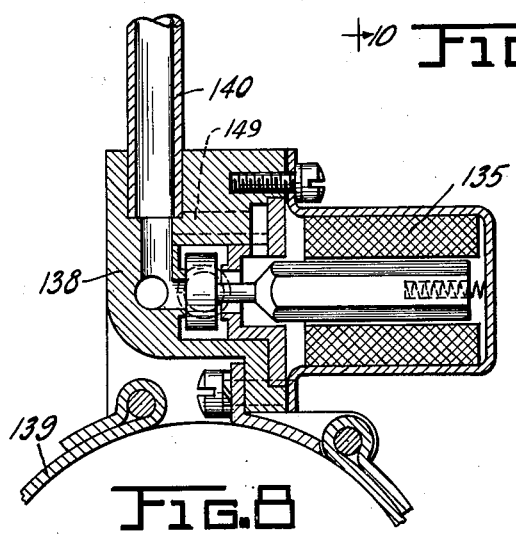
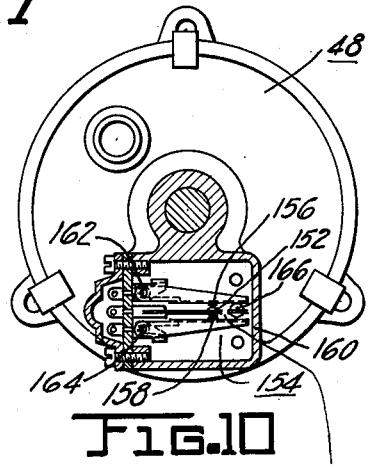
SUPPORT ARM
FOR CONTACT
152 IS BROKEN
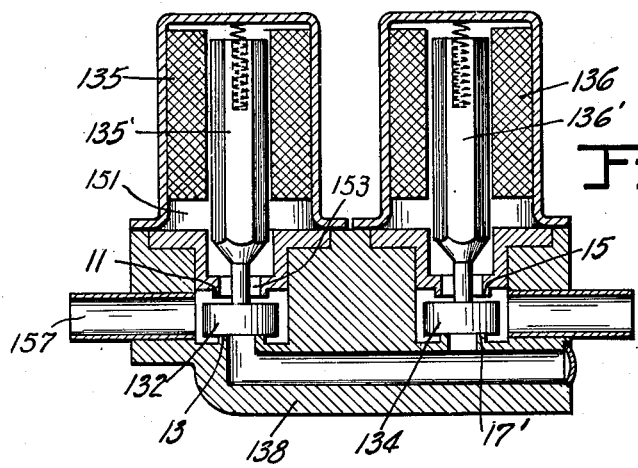
INVENTOR.
GEORGE AINSWORTH
BY
H. O. Clayton
ATTORNEY

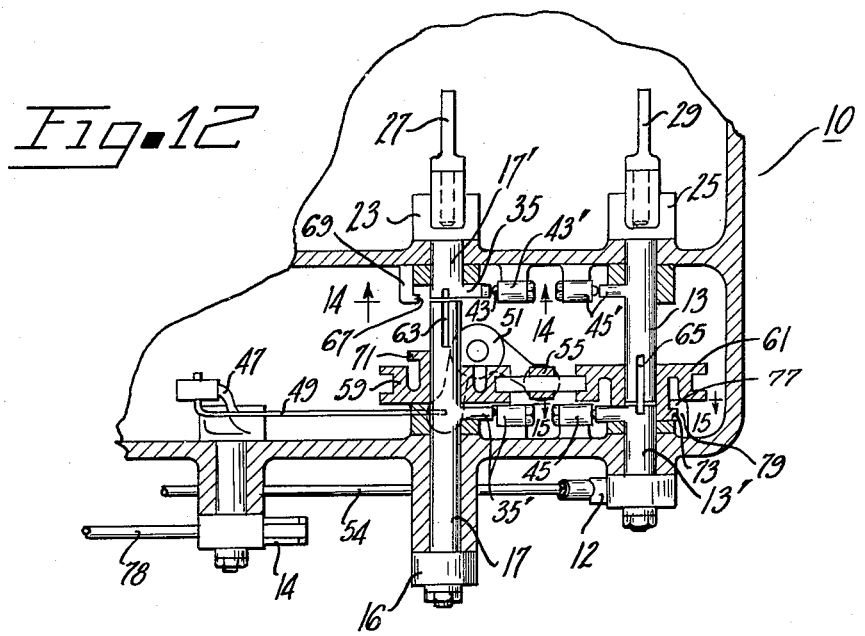
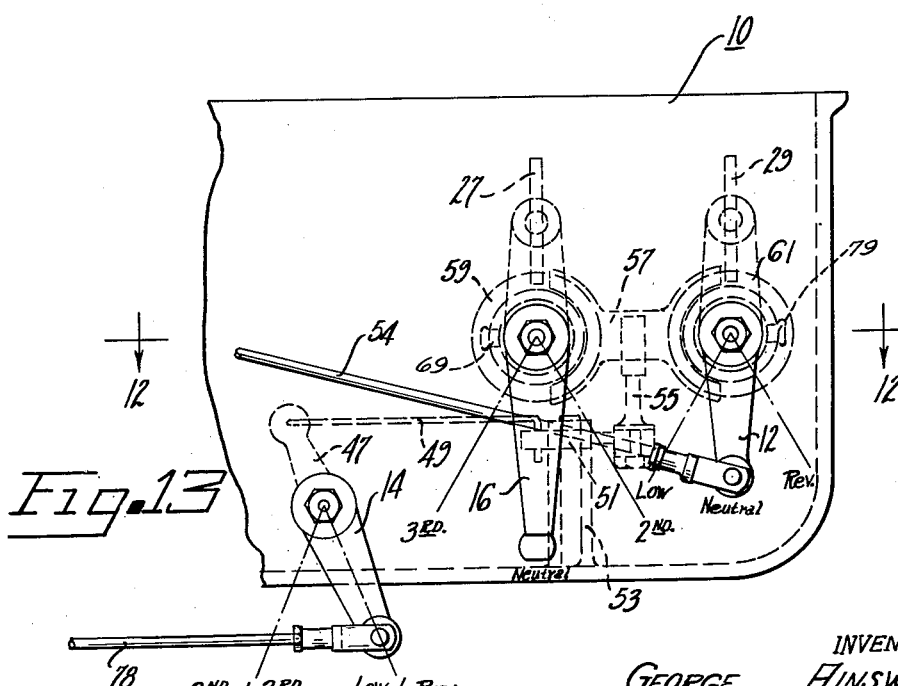

March 17, 1953 G. AINSWORTH 2,631,703
TRANSMISSION OPERATING MECHANISM
Filed Oct. 24, 1945 6 Sheets-Sheet 6

INVENTOR
GEORGE AINSWORTH
BY
H. O. Clayton

Patented Mar. 17, 1953

2,631,703

UNITED STATES PATENT OFFICE 2,631,703

TRANSMISSION OPERATING MECHANISM

George Ainsworth, Detroit, Mich., assignor to Bendix Aviation Corporation, South Bend, Ind., a corporation of Delaware Application October 24, 1945, Serial No. 624,131

26 Claims. (Cl. 192—.073)

This invention relates in general to the power transmission mechanism of an automotive vehicle and in particular to means for operating the change-speed transmission of said mechanism.

One of the principal objects of my invention is to provide, in an automotive vehicle including a fluid coupling, a friction clutch, and a change-speed transmission, a simple mechanism, power operated in part, for operating said transmission a relatively low gear setting and a reverse gear setting thereof being effected by a manual operation of said mechanism; and two relatively high gear ratio settings of the transmission, the neutralization of the transmission from either one of the latter settings, and the operation of the friction clutch to facilitate the power operation of the transmission, being effected by power means.

Yet another object of the invention is to amplify the above described power means so that the engine throttle of the automotive vehicle is momentarily closed by power means during the operation of the transmission and friction clutch.

Yet another object of my invention is to provide a power plant for an automotive vehicle said power plant to include, in combination with a fluid coupling, a friction clutch and a change speed transmission, means, operative at certain critical speeds of the vehicle and after the gear shift lever of the power plant is placed in a certain position, for automatically effecting a successive disengagement of the clutch, an operation of the transmission, and a re-engagement of the clutch, said cycle of operations being initiated by a release of the accelerator and being effected by the operation of a pressure differential operated motor. There is thus provided automatically operated means for operating the clutch and transmission of an automotive vehicle, the control of said operations requiring but a minimum of thought and effort by the driver of the vehicle.

A further object of my invention is to provide, in an automotive vehicle including a friction clutch and a three speeds forward and reverse transmission, and preferably including a fluid coupling means for operating and for facilitating the operation of said transmission including power means comprising motor means, automatically operable to establish the transmission either in its second gear setting or its high gear setting depending upon the speed of the vehicle, the friction clutch being operated by said motor means to facilitate this operation of the transmission, said first mentioned means further including manually operated means for effecting either a low gear or a reverse gear setting of the transmission.

Yet another object of my invention is to provide means for operating the friction clutch and the three speeds forward and reverse transmission of an automotive vehicle said means including but one motor the power element of which is operably connected to both the clutch and the means for effecting the second and high gear operations of the transmission, and further including manually operated means for effecting the low and reverse gear settings of the transmission.

Yet another object of my invention is to provide, in the power plant of an automotive vehicle, an internal combustion engine, an engine controlling throttle, a change speed transmission and a fluid coupling and a friction clutch interconnecting said engine and transmission, in combination with manual and power operated mechanism for operating and controlling the operation of the throttle, the friction clutch and the transmission, said mechanism including manually operable means for effecting either a reverse gear setting of the transmission or a relatively low gear setting thereof and further including power means, comprising a clutch and transmission operated pressure differential operated motor, for alternately effecting two relatively high gear settings of the transmission the clutch being also operated by said motor to facilitate said operations of the transmission.

An important object of my invention is to provide a power plant for an automotive vehicle the control of which requires but a minimum of physical and mental effort on the part of the driver; and to this end it is an object of my invention to provide, in a power plant including a friction clutch of standard design, a fluid coupling of standard design, a change gear transmission and an internal combustion engine having a throttle valve, manually and power operated mechanism for operating the throttle valve, clutch and the transmission, the controls for said mechanism being limited to the accelerator, a clutch pedal, and a shift lever of which controls the accelerator receives by far the greater use.

A further object of my invention is to provide a power plant for an automotive vehicle said plant to include an internal combustion engine, a three speeds forward and reverse transmission, means interconnecting the engine and transmission comprising a fluid coupling and a friction clutch, and power and manually operated means for manually operating the clutch and transmission to establish the latter in its reverse and low gear settings and for successively disengaging the clutch, establishing the transmission in either its second or high gear settings and then re-engaging the clutch all by the operation of power means, said means being controlled, to effect said uninterrupted cycle of operations, by the operation of the gear shift lever, and the accelerator of the power plant and by the operation of a vehicle speed responsive governor.

A further object of my invention is to provide a simple mechanism for operating the friction clutch and three-speeds forward and reverse transmission of an automotive vehicle the operation of said mechanism being controlled by a shift lever preferably positioned beneath the steering wheel of the vehicle, the accelerator of the vehicle and the manually operated clutch pedal of the vehicle the parts of said mechanism being so constructed and arranged that the transmission is manually operated to establish the mechanism in either a reverse gear setting or a low gear setting of the transmission and furthermore so constructed and arranged that the transmission is operated by power means to establish the same in either its second gear setting or its high gear setting the latter operations being facilitated by a power operation of the friction clutch.

Still another object of my invention is to provide, in an automotive vehicle including a fluid coupling, a three-speeds forward and reverse transmission and a friction clutch, means for operating the transmission and clutch including manually operated means for establishing the transmission in either its low gear or its reverse gear setting and power means for automatically establishing the transmission in either its second gear setting or its high gear setting depending upon the operation of a vehicle speed responsive governor and the accelerator of the vehicle said power means being further operable, at the will of the driver, for establishing the transmission in its second gear setting and for neutralizing the transmission from either of its second gear or high gear settings.

One of the most important objects of my invention is to provide, in an automotive vehicle including a fluid coupling in its power plant, a simple and inexpensive mechanism for automatically establishing the change speed transmission of the vehicle in one or the other of two relatively high gear settings and for operating the friction clutch of the vehicle to facilitate said operations of the transmission, said mechanism serving, in effecting each of said operations, to successively disengage the clutch, operate the transmission and then re-engage the clutch in one cycle of operations; and another object of my invention is to control the aforementioned mechanism by vehicle speed responsive means and the accelerator of the vehicle whereby said cycles of operation are initiated at certain critical speeds of the vehicle and when the accelerator is released.

Other objects of the invention and desirable details of construction will become apparent from the following detailed description of a preferred embodiment of the invention disclosed in the specification to follow and disclosed in the accompanying drawings in which:

Figure 3 is a view, partly in section, of the transmission controlling selector lever preferably secured to the steering post beneath the steering wheel.

Figure 4 is a view disclosing in detail the cross-shift switch mechanism of my invention;

Figure 6 is a plan view of the transmission and clutch operating pressure differential operated motor of my invention;

Figure 7 is a vertical sectional view of the motor shown in Figure 6;

Figure 2:
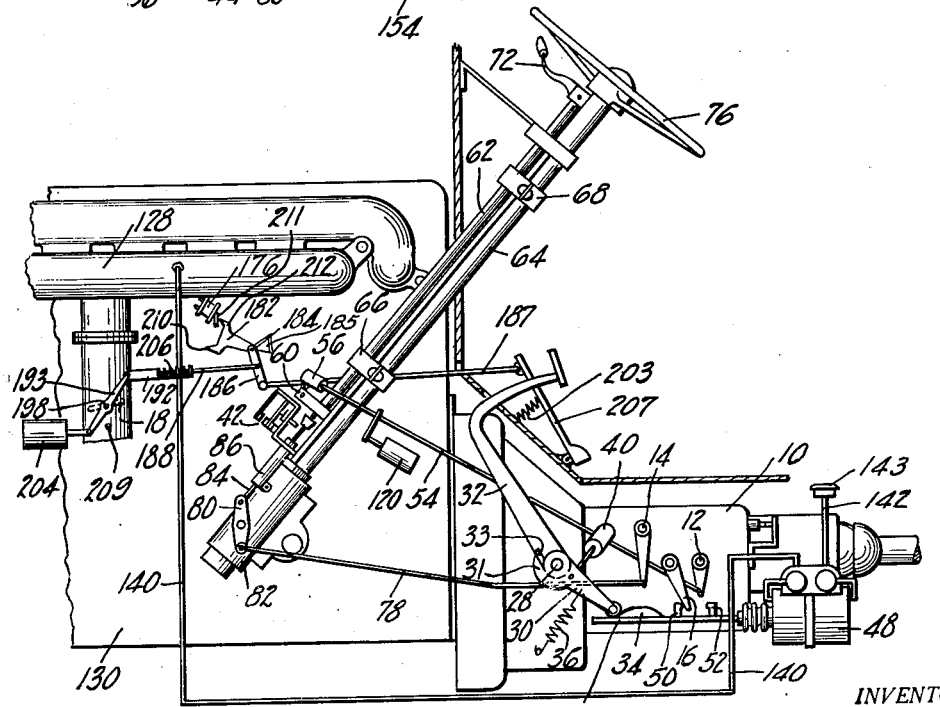
Figure 2 is another diagrammatic view said view disclosing the principal elements constituting my invention.
Figure 11:
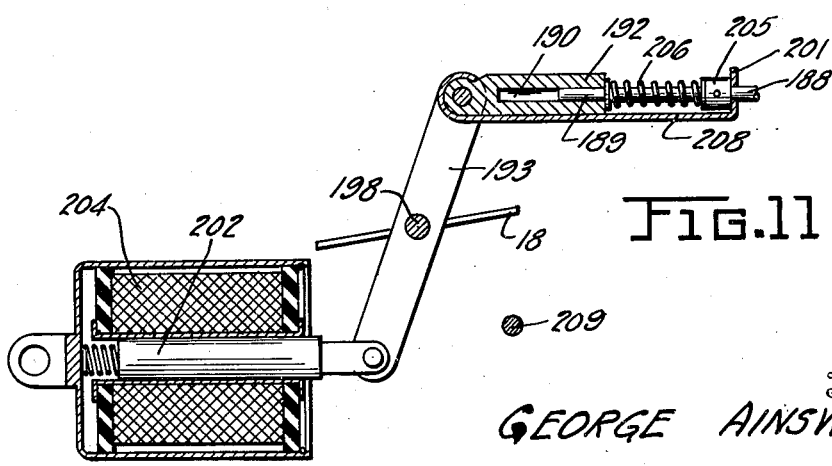
Figure 14:
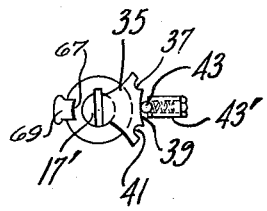
Figure 15:
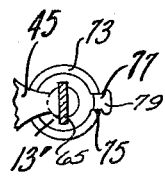
Figure 16:
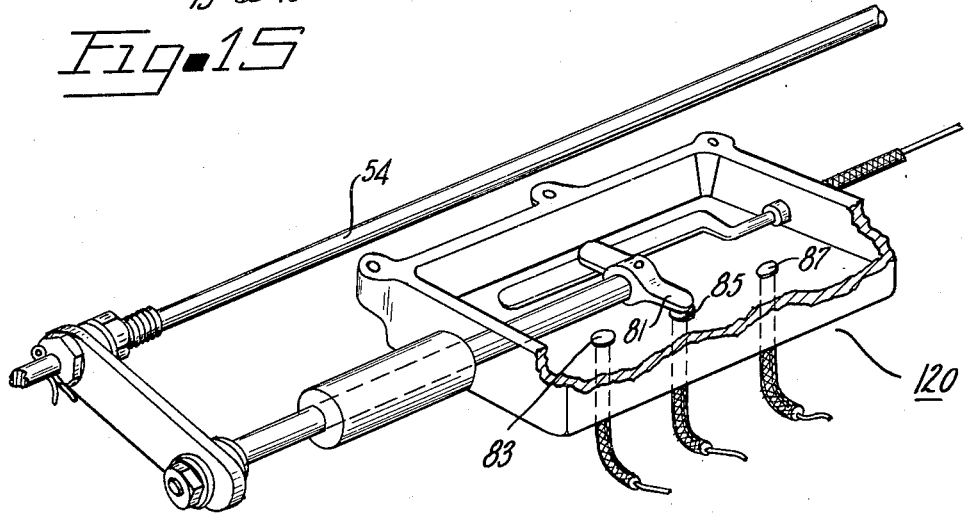

Figures 8 and 9 are sectional views of the transmission operating motor of Figure 6 said views being taken on lines 8—8 and 9—9 thereof, respectively;

Figure 10 is another sectional view, taken on the line 10—10 of Figure 7, disclosing details of the motor operating neutral switch;

Figure 11 is a detail sectional view of a portion of the engine throttle operating mechanism shown in Figure 2;

Figure 12 is a sectional view disclosing details of a three speeds forward and reverse transmission which is operated by the mechanism of my invention;

Figure 13 is a side view of the transmission mechanism disclosed in Figure 12;

Figure 14 is a sectional view, taken on the line 14—14 of Figure 12, disclosing details of the detent mechanism for maintaining the setting of the transmission;

Figure 15 is a sectional view taken on the line 15—15 of Figure 12 disclosing details of the means for preventing a cross-shift operation of the transmission until after the same has been neutralized; and Figure 16 is a view disclosing details of the manually operated selector switch mechanism of my invention.

Referring now to Figure 2 disclosing a preferred embodiment of my invention, a three-speeds forward and reverse transmission 10 is operated by means of manually operated cranks 12 and 14 and a power operated second and high gear operating crank 16, the crank 14 serving to operate the shift rail selecting mechanism of the transmission and the cranks 12 and 16 serving to operate that part of the transmission functioning to move the selected rail to establish the transmission in the desired gear ratio. As will be brought out in the description to follow the transmission mechanism 10 is such that the crank 16 must be moved to its transmission neutral position, to neutralize the transmission, before the shift rail selecting crank 14 may be operated; and as will also be apparent from the description to follow the low and reverse gear operating crank 12 swings idly, that is, the same is inoperative to effect an operation of the transmission, until the cross-shift operation of the crank 14 has been completed. The transmission 10, to which no claim is made, is disclosed in detail in Figures 12 to 15 inclusive and includes a rotatably mounted two-part low and reverse gear shift rail 13, 13' and a rotatably mounted second and high gear shift rail 17, 17'. A crank arm 23 is operably connected to one end of the part 17' of the latter rail and a similar crank arm 25 is operably connected to one end of the part 13 of the rail 13, 13'. To the upper end of the crank arm 23 there is pivotally connected a U-shaped shifter fork 27; and to the upper end of the crank 25 there is pivotally connected a shifter fork 29. Rotation of the shift rail 17, 17' by means of the crank 16, serves to move the fork 27 either to the left or to the right, Figure 12, thereby effecting an operation of certain gears of the transmission to establish the same in either its second gear setting or its high gear setting; and rotation of the shift rail 13, 13', by means of the crank 12, serves to move the crank 29 either to the left or right, Figure 12, thereby effecting either a low gear setting or a reverse gear setting of the transmission.

To the inner end of the part 17' of the second and high shift rail 17, 17' there is fixedly secured a relatively small crank 35, Figure 14, said crank being provided on its outer face with recesses 37, 39 and 41; and a spring loaded ball 43 housed within a casing 43' is biased into engagement with said recesses the particular recess receiving the ball depending upon whether the transmission is neutralized or is established in second gear or in third gear.

A duplicate of the above described detent mechanism, indicated in general by the reference numeral 45, Figure 12, serves to maintain the member 13' in its three operative positions, that is its low gear position, its high gear position and its transmission neutral position; and similar detent mechanisms 35' and 45' serve, respectively, to maintain the rail members 17 and 13 in their three selective positions.

The aforementioned shift rail selecting mechanism includes a crank 47 operably connected to the crank 14; and to the upper end of the crank 47 there is pivotally connected a rod 49 which is pivotally connected to a bell crank lever 51 mounted on the upper end of a post 53, Figure 13. To the end of one of the arms of the lever 51 there is pivotally connected an arm 55; and the upper end of the latter arm is forked to receive a thrust member 57 which is fork-shaped at its outer ends and received within recesses in sleeve members 59 and 61. The latter members, which serve as latch members, are sleeved over the shift rail portions 17 and 13 respectively. These sleeve members 59 and 61 are each provided with keyways to receive key members 63 and 65 respectively.

Briefly describing the operation of the transmission mechanism 10, to effect say the low gear setting of said transmission the driver will first move a shift lever 72 to its transmission neutral position thereby effecting an operation of the power means to neutralize the transmission. This power means and its operation is described hereinafter; and the force transmitting means interconnecting the shift lever 72 with the transmission operating cranks 12 and 14, is also included in the description to follow. In effecting the aforementioned transmission neutralizing operation the crank 16 is moved to its straight up-and-down position, that is the position disclosed in Figure 13; and when in this position the sleeve 59 may be moved laterally out of engagement with an inwardly extending flange 67 constituting the end of a post 69 secured to the casing of the transmission. Describing this interlock between the flange 67 and the sleeve 59 the latter is preferably provided with an end flange 71 which is provided with a recess shaped to receive the flange 67 when said sleeve, operating as a latch member, is moved laterally to its position to make possible either a second gear or high gear operation of the transmission.

The transmission having been neutralized the driver will then rotate the shift lever 72 toward the steering wheel, that is lift up said lever; and as described below this cross-shift operation will serve to rotate the crank 14. Now this rotation of the crank 14 or so-called cross-shift operation of the transmission will serve to move the sleeves 59 and 61 to the positions disclosed in Figure 12, that is the positions making possible either a low gear, reverse gear or neutralizing operation of the transmission; and these operations are effected by rotating the crank 12.

To make possible the second or high gear operation of the transmission by the power means hereinafter described, the driver will first neutralize the transmission by moving the shift lever 72 to its transmission neutral position; and this operation serves to rotate the rail 13, 13' to neutralize the transmission. The driver will then remove his hand from the selector lever 72 thereby permitting a spring 90 to expand. The spring 90, operating as a power means, will serve to move the sleeves 59 and 61 laterally to again move the flange 71 on the sleeve 59 past the flange 67 on the post 69 the recess in said flange making this relative movement possible.

Figure 15 discloses the means for preventing a cross-shift operation of the transmission when the same is established in either its low gear setting or its reverse gear setting; and this interlock means includes a flange 73 on the end of the sleeve 61. The latter flange is provided with a recess 75 to receive a flange 77 extending from the end of a post 79 secured to the transmission casing. Incidentally, this locking mechanism duplicates that described above and which is operative to prevent a cross-shift operation of the transmission when the same is established in either its second gear setting or its high gear setting.

There is thus provided by the above described interlock means, a structure which makes it impossible to effect a cross-shift, that is rail selecting operation of the transmission, when the transmission is established in gear; for when the shift rail 13, 13' and the sleeve 61 mounted thereon, are rotated either clockwise or counterclockwise away from their transmission neutral position, then the flange 77 is positioned out of registry with the recess 75 thereby making it impossible to slide the sleeve 61 along the shaft 13.

There is provided, by the change gear transmission 10 disclosed in Figures 12 to 15 inclusive, a mechanism for selectively effecting any one of three forward speed settings of the transmission or a reverse gear setting thereof; and said operation is effected by the manually and power operated means described hereinafter.

Figure 5:
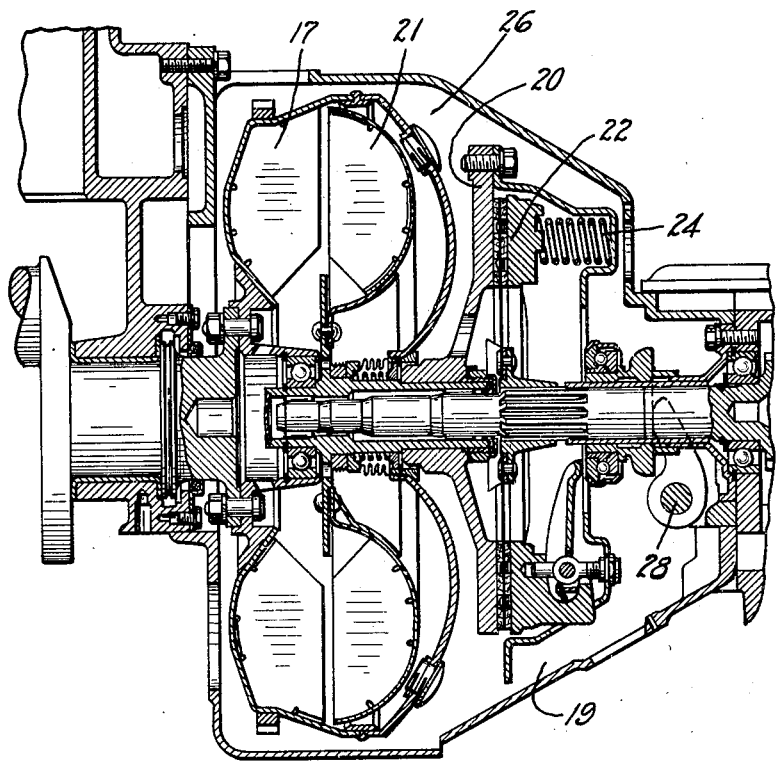
Figure 5 is a sectional view disclosing in detail a fluid coupling and a friction clutch said mechanism constituting elements of the power plant of the vehicle which cooperate with the transmission operating means of my invention.

My invention has to do with the manually and power operated means for actuating the aforementioned transmission operating cranks 12, 14 and 16; for operating the engine throttle 18, and for operating a conventional friction clutch 19, Figure 5, said clutch including a driving plate 20 and a driven plate 22 forced into engagement by clutch springs 24. This friction clutch is of conventional design, accordingly, no claim is made thereto. A feature of my invention lies in the combination of a fluid clutch or so-called fluid coupling 26, Figure 5, such as that which was incorporated in several prewar passenger vehicles, with the aforementioned mechanism for operating the transmission, throttle and friction clutch; and this coupling includes, of course, an impeller 17 and a vaned runner 21 the latter serving to drive the aforementioned driving plate 20 of the clutch 19.

The friction clutch is operably connected to a clutch throw-out shaft 28 to which is keyed a crank member 30; and a flange portion 31 of the latter member is contactable by a laterally extending flange 33 extending from a manually operated clutch pedal 32 which is rotatably mounted on the shaft 28. A spring 32' serves to bias the clutch pedal to a clutch released position in contact with a stop 33'. With this mechanism the clutch pedal remains stationary when the clutch is disengaged by the hereinafter described clutch operating power means; the shaft 28 is, however, rotated to disengage the clutch when the pedal 32 is depressed preliminary to effecting either a reverse gear or low gear operation of the transmission. The aforementioned crank 30 is slidably mounted on the shaft 28 and said crank is biased laterally in one direction into alignment with a cam 34 by a spring 36 and is bodily moved laterally in the opposite direction out of alignment with said cam and into alignment with the flange 33 by means of a grounded solenoid motor 40 controlled by a part of switch mechanism 42, Figure 1. The cam 34 is mounted on one end of a rod 44 connected to the power element 46 of a double-acting clutch and transmission operating motor 48 disclosed in detail in Figures 7 to 10 inclusive. Pickup fingers 50 and 52 mounted on the rod 44 serve to contact the high and second gear transmission operating crank 16 and the parts are so constructed and arranged and the mechanism is so operative that as the power element 46 moves from one operative position to the other the clutch is first disengaged and the transmission is then established in a new setting as the reengagement of the clutch is completed; and as will be described in detail hereinafter the transmission may be neutralized by the power means, at which time the clutch is disengaged.

Continuing the description of the transmission, clutch and throttle operating mechanism of my invention the low and reverse gear operating crank 12, Figure 2, is actuated by manually operated means including a rod 54 having an enlarged end member 56 all as disclosed in Figures 2 and 4. To the end of the member 56 there is secured a spherically-shaped member 58 fitting within the recess in the end of a crank 60 secured to the end of a tube 62, the latter being secured to the steering post 64 of the vehicle by brackets 66 and 68. As disclosed in Figure 3 a hollow housing member 70 is secured to the upper end of the tube 62 and the shift lever 72 is pivotally mounted at 74 to said member. Rotation of the shift lever in a plane parallel to the steering wheel 76 of the vehicle serves to rotate the tube 62 connected thereto which, in turn, through the intermediary of the crank 60 and its universal connection with the member 56, places the rod 54 either in tension or compression to rotate the crank 12.

The crank 14 which operates the shift rail selecting mechanism is rotated by the manually operated mechanism disclosed in Figures 2, 3 and 4. This mechanism includes a rod 78, preferably connected to a lever 80 pivotally mounted on a support 82 for the steering post. To one end of the lever 80 there is pivotally connected a rod 84, which extends through a housing member 86 also secured to the support 82. From the member 86 the rod 84 extends through the tube 62 and is provided, at its upper end, with a pin 88. One end of the shift lever 72 is provided with an opening, and said lever is, as disclosed in Figure 3, sleeved over the pin 88. The aforementioned spring 90 surrounding the rod 84 and interposed between a seat 92 in the housing member 70 and one end of the selector lever, serves to move or bias said rod upwardly and thereby maintain the crank 14 in position preparatory to effecting a second or high gear operation of the transmission; in other words, unless the driver of the vehicle rotates the shift lever upwardly or counterclockwise in a plane perpendicular to the plane of the steering wheel, the spring 90 serves to maintain the shift lever in position preparatory to placing the transmission either in second gear or in high gear by the power means described in detail hereinafter. It is apparent from the preceding description that the manual operation of the transmission to establish the same in either a reverse gear setting or a low gear setting is accomplished by first effecting the shift rail selecting operation of the shift lever 72 to rotate the bell crank lever 51 clockwise thereby moving the sleeve 61 to interconnect the shift rail parts 13 and 13'. The lever 72 is then rotated in a plane parallel to the plane of the steering wheel to effect a rotation of the crank 12 to operate the shift rail 13, 13'.

It is to be noted at this juncture that the cross-shift operation of the shift lever, that is, the lifting up of said lever preparatory to effecting the manual operation of the transmission to establish the same in either its low gear or its reverse gear setting, effects an operation of the aforementioned switch mechanism 42. Describing now this switch mechanism and its operation the same comprises a contact 94 mounted on one end of a lever 96 pivoted at 98 to a bracket 100, said lever being biased downwardly by a spring 102. The bracket is secured to the housing member 86 and is provided with an opening to receive a pin 104 secured to the lever 96. The end of said pin is rounded to cooperate with a cone 106 fixedly secured to the rod 84. When the selector 72 is rotated counterclockwise, in a plane perpendicular to the plane of the steering wheel, the rod 84 and its connected cone 106 are moved downwardly, thus forcing the cone into engagement with the pin 104 to move the latter outwardly. This operation serves to rotate the lever 96 about its fulcrum to thus move the contact 94 out of engagement with a contact 108 and thereby break the circuit to the remainder of the hereinafter described electrical control means of my invention; and this operation of the lever 96 also serves to move a contact 109 fixed to said lever into engagement with a fixed contact 110 which is secured to a switch support member 112 secured to the bracket 100.

Figure 1:
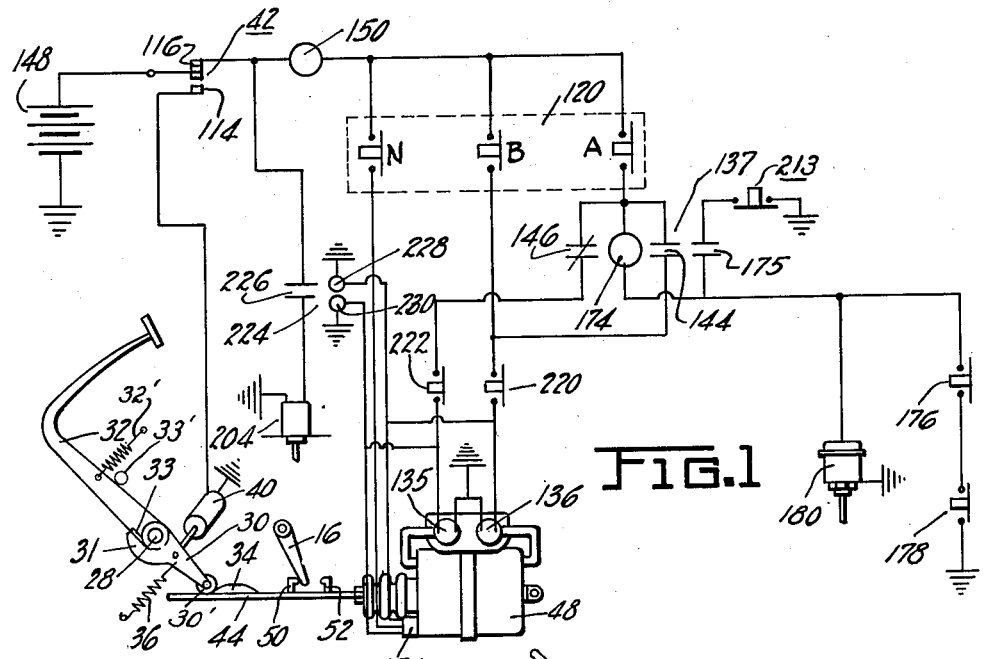
Figure 1 is a diagrammatic view disclosing the principal features of the electrical control means of the transmission operating mechanism constituting my invention.

It is apparent, therefore, that the switch mechanism 42 consists of two switches, one of said switches, indicated by the reference numeral 114, Figure 1, consisting of contacts 109 and 110 and the other of said switches, indicated by the reference numeral 116 consisting of the contacts 94 and 108. As will be brought out in the description to follow, the switch 114 serves to control the aforementioned cross-shift operating solenoid motor 40 and as indicated above the switch 116 serves as a breaker switch to control the flow of electricity to the remainder of the electrical control means of my invention. It follows therefore that when the shift lever 72 is actuated to effect the so-called cross-shift operation of the transmission mechanism that the two switches 114 and 116 of the switch mechanism 42 are operated to (1) render inoperative the remainder of the electrical control means of my invention disclosed in Figure 1 of the drawings, and (2) to complete an electrical circuit to effect an energization of the solenoid 40.

Describing now the remainder of the control means of my invention including the aforementioned electrical control means controlled by the breaker switch 116, it is to be noted at the outset that the shift lever 72 may be moved to any one of five control positions; and two of these positions have been referred to above, that is, the low and reverse gear settings of the shift lever effected by first rotating said lever toward the steering wheel and then rotating the lever either clockwise or counterclockwise in the plane of said wheel. To prepare the mechanism of my invention for an automatic operation the shift lever is rotated counterclockwise to a position intermediate its low and reverse gear positions thereby making it possible for the spring 90 to bias the shift lever to a transmission neutral position. The driver then rotates the shift lever clockwise to close a switch indicated by the letter A in Figure 1 and by the reference numerals 81, 83 in Figure 16, said switch constituting one of three switches of a selector switch mechanism indicated as a whole by the reference numeral 120, Figures 1, 2 and 16. As is disclosed in the latter figures the three switches of the selector mechanism 120 are all operatively connected to the rod 54. The neutralizing switch of the mechanism 120 is indicated by the reference numerals 81, 85 in Figure 16 and by the letter N in Figure 1; and the second gear switch of said switch mechanism 120 is indicated by the reference numerals 81, 87 in Figure 16 and by the letter B in Figure 1. It is to be noted however, from the preceding description of the operation of the switch 116, that said three switches are inoperative as control means when the crank 12 is being manually actuated to establish the transmission in either its reverse gear or its low gear setting.

If the driver wishes to effect a power operation of the transmission to establish the same in its second gear setting he rotates the shift lever 72 counterclockwise to its second gear position to thereby effect the second gear setting of the selector switch mechanism 120; and this operation effects a closing of switch B of said mechanism, Figure 1; and if the driver wishes to neutralize the transmission by the power means he will position the shift lever in its transmission neutral position, that is a position half way between the last two mentioned positions. The selector switch mechanism 120 is then established in its transmission neutral position thereby closing switch N of said mechanism, Figure 1.

Describing now in detail the aforementioned transmission and clutch operating motor 48 and the control means therefore not heretofore described, said motor is disclosed in detail in Figures 6 to 10, inclusive, and includes a double-ended casing 122 housing the aforementioned piston 46. End compartments 124 and 126 of said motor are adapted, as will be more fully described hereinafter, to be alternately connected to a source of vacuum, preferably the intake manifold 128 of the internal combustion engine 130 of the vehicle, and to the atmosphere by means of solenoid operated three-way valves 132 and 134. Grounded solenoids 135 and 136 which control the operation of said three-way valves are in large measure controlled by a relay mechanism 137, Figure 1, and by the aforementioned manually operated three position selector switch 120.

As shown in Figures 8 and 9 the valve mechanism comprises a casing 138 to which are secured the solenoids 135 and 136; and this casing is preferably detachably secured to the motor 48 by means of a band 139. To the armatures 135' and 136' of the aforementioned solenoids are secured the valves 132 and 134 the valve 132 being adapted to seat at 11 and 13 and the valve 134 at 15 and 17' to alternately connect the motor with the vacuum or atmosphere. Briefly describing the pneumatic connections, a conduit 140 serves to interconnect in intake manifold 128 of the engine with the valve mechanism and a conduit 142 interconnects said valve mechanism with an air cleaner 143, Figure 1.

Referring to the electrical means of Figure 1, solenoid 136 is wired to a normally open switch 144 of the aforementioned relay 137; solenoid 135 is wired to a normally closed switch 146 of said relay and each of said switches 144 and 146 is connected in series, by suitable wiring, to a grounded battery 148, the ignition switch 150 of the car, the aforementioned so-called automatic switch A of the selector switch mechanism 120 and the aforementioned switch 116 of the switch mechanism 42. The transmission neutral switch N of the selector switch mechanism is wired to a fixed contact 152 of a neutral switch mechanism 154, Figure 10, disclosed in Kliesrath Patent No. 2,156,118, dated April 25, 1939; and as is disclosed in the latter patent a movable contact 158 of said neutral switch mechanism is electrically connected by suitable wiring to the grounded solenoid 135 and to the relay switch 146; and another movable contact 156 of said neutral switch mechanism is electrically connected by suitable wiring to the grounded solenoid 136 and to relay switch 144. As is disclosed in Figure 1 the second gear that is overrule switch B of the three-position selector switch 120 is wired to the wire which interconnects the grounded solenoid 136 and the switch 144.

Figures 7 and 10 disclose details of the motor unit 48 and the above described neutral switch 154 the latter comprising a casing 160 preferably built into the cylinder of said motor and housing the aforementioned movable electrical contacts 156 and 158 which are pivotally secured to the casing at 162 and 164 respectively. The latter contacts are biased by springs, not shown, into engagement with the aforementioned fixed contact 152 but are normally held spaced from said contact by an enlarged end portion 166, Figure 7, of a lever 168 pivoted within the motor at 170; and said lever is preferably biased, by a spring 172, to a position to permit electrical contact 158 to engage the contact 152. The parts are, however, so constructed and arranged and so operative that when the piston 46 is in its transmission neutral position, that is, the position disclosed in Figures 7 and 10 then both of the movable contacts 156 and 158 are spaced from the fixed contact 152.

Very briefly describing the operation of the neutral switch 154 it will be apparent, from the aforementioned description of said switch and operating means therefor, that one or the other of the contacts 156 or 158 is in contact with the contact 152 when the transmission is established in either its high gear setting or its second gear setting; and it follows that to neutralize the transmission the driver need but close the aforementioned neutral switch N thereby completing the electrical circuit necessary to effect an energization of the motor 48.

The coil 174 of the relay 137 is wired to an accelerator operated kickdown snap switch 176, Figures 1 and 2, and interposed in series in the latter electrical connection there is included a grounded air operated limit switch 178, such as that disclosed in Claytor Patent No. 2,214,099, dated September 10, 1940, the function of which is to open the electrical circuit, to render the kickdown switch inoperative, when the speed of the vehicle exceeds say 40 M. P. H. And as is disclosed in Figure 1 the coil 174 of the relay 137 is also wired to a grounded vehicle speed responsive governor operated breaker switch 180 said switch being closed by the governor when the speed of the vehicle is lowered to say 15 M. P. H.

Referring to Figure 2 the aforementioned kickdown switch 176 is actuated by a crank 182 keyed at one of its ends to a shaft 184, and said shaft is supported by a bracket 185. A crank 186 is keyed at its upper end to the shaft 184 and is pivotally connected at its lower end to an accelerator operated link 187; and to the central portion of the crank 186 there is connected a link 188, which at its lower end portion 189, extends through an opening 190 in an end member 192. The member 192 is pivotally connected at one of its ends to one end of a throttle operating crank 193 which is keyed, in its central portion, to a shaft 198; and said shaft is keyed to the aforementioned throttle valve 18 of the carburetor of the engine. To one end of the crank 193 there is pivotally connected the armature 202 of a throttle closing solenoid 204 the operation of which is hereinafter described. A spring 206, sleeved over the end portion 189 of the link 188, is positioned between a collar member 205 secured to the link 188 and one end of the member 192. A bracket 208 limits the separation between the link 188 and the member 192 and closes the throttle valve 18 when the accelerator pedal is released.

The throttle-operating mechanism, therefore, is such that movement of the accelerator pedal 207 throughout its normal range will cause a corresponding adjustment in the throttle valve 18 between its limits of fully closed and wide open positions. When the accelerator has been depressed to the wide open throttle position the crank 193 engages a stop 209 and further depression of the accelerator, to close the switch 176 for the kickdown transmission control is accommodated by the yielding of spring 206 while the throttle valve remains fully open. On release of the accelerator, spring 206 and a spring 203 acting on the accelerator both act until collar 205 engages the rear flange 201 of bracket 208 and thereafter throughout the normal range of throttle adjustment, spring 203 alone serves to restore accelerator and close the throttle valve.

Describing now the operation of the kickdown switch to place the transmission in its second gear setting when the accelerator pedal moves in its kickdown range, that is, after the throttle valve 18 is moved to its fully open position into contact with the stop 208, then a finger 210 extending from one end of the crank 182 throws a switch actuator 211 rearwardly to close the switch 176 and said switch remains closed until the accelerator is again fully released or substantially so at which time a finger 212 extending from said crank restores actuator 211 to the Figure 1 position to open said switch. It is apparent therefore that the driver may at any time during the driving of the vehicle, say when it is desired to quickly pass a car on the road, effect a second gear setting of the transmission merely by depressing the accelerator beyond its fully throttle opened position.

Describing another feature of my invention the accelerator serves, when depressed to open the throttle valve of the carburetor, to close a grounded switch 213 which, as disclosed in Figure 1, is wired in series with the relay coil 174; and the latter element when energized serves to close a normally open switch 175 of the relay mechanism said switch being included in the latter electrical connection. It is apparent, therefore, that there is provided by the switch 213 in combination with the relay 137, which includes the coil 174 and the switches 146, 144 and 175, a holddown relay mechanism; for after the switch 144 is closed by an operation of the governor operated switch 180 then the same remains closed, to maintain the transmission established in its second gear setting, so long as the driver maintains the accelerator depressed to maintain the switch 213 closed. In other words, with this control the driver may hold the transmission in its second gear setting despite the fact that the transmission is travelling above governor speed; and as will be brought out in the description to follow the transmission is subsequently established in its high gear setting when the accelerator is released to reverse the driving torque.

Describing now in brief the operation of the mechanism of my invention it will be assumed that the selector switch 120 is placed in its transmission neutral position prior to a closing of the ignition switch 150 and a starting of the engine. Then after the engine is cranked the intake manifold 128 becomes partially evacuated by virtue of the idling engine whereupon the electro-pneumatic power means of my invention is rendered operative to disengage the clutch and neutralize the transmission.

To get the vehicle under way the driver will then probably establish the transmission in its low gear setting; and to effect this operation the shift lever 72 is moved to its low gear position by first lifting up said lever against the tension of spring 90 and then rotating said lever in a clockwise direction to its low gear position. The lifting up of the lever 72 effects a low and reverse shift rail selecting operation of the crank 14 and a closing of the switch 114; and the latter operation effects an energization of the motor 40 to draw the crank 30 to the right, that is away from the cam 34 and into registry with the flange 33 on the manually operated clutch pedal 32. The driver will then depress said pedal to disengage the clutch and he will then move the shifter lever 72 clockwise to actuate the crank 12, Figure 2, to establish the transmission in its low gear setting. The accelerator is then depressed to increase the speed of the engine and the clutch pedal is released to engage the clutch thereby getting the vehicle under way in low gear.

After the desired vehicle speed is reached with the transmission in low gear the driver will probably desire a subsequent automatic operation of the transmission; and to effect this result he will first depress the clutch pedal to align the roller 30' with the top of the cam 34. He will then neutralize the transmission by rotating the shift lever 72 counter-clockwise out of its low gear setting. The subsequent movement of the lever 72 to its automatic position, that is the position to close the switch A, will effect a second and high gear rail selecting operation of the crank 14, and opening of the switch 114 to de-energize the motor 40 thereby permitting the spring 36 to move the crank 30 laterally so that the roller 30' is positioned on the cam 34, and a closing of the switch 116 to make possible the subsequent clutch and transmission operating operations of the motor 48. If the vehicle is at this time travelling below governor speed then the grounded switch 180 will be closed thereby effecting an operation of the relay 137 to open the normally closed switch 146 and close the normally open switch 144; and this operation of the relay switch mechanism will close the electrical circuit to the second gear solenoid 136 thereby energizing said solenoid to open the valve 134 to connect a compartment 126 of the motor 48 with the intake manifold 128. A compartment 124 of the motor 48 is at this time vented to the atmosphere via the air cleaner 143, the duct 142, a duct 149, Figures 6 and 8, in the valve casing, a compartment 151, Figure 9, in said casing, a port 153, and a conduit 157.

The mechanism is then prepared for a second gear operation of the transmission and an operation of the clutch to facilitate said operation; and said operations are automatically effected when the driver releases the accelerator to idle the engine to make of the intake manifold a source of vacuum to energize the motor 48. In this second gear operation of the motor 48 the piston 46 and the rod 44 connected therewith move to the right, Figure 1, to establish the transmission in its second gear setting and concurrently re-engage the clutch as this operation of the transmission is being completed. It is also to be noted that I prefer to include in the electrical circuit for controlling the solenoid 136 a transmission operated switch 220 the mechanism being so constructed and so operative that said switch is broken, to deenergize the solenoid 136, just as the second gear operation of the transmission is being completed; and said switch 220 is preferably spring biased to a closed position when the transmission is established in any setting other than its second gear setting.

The transmission, having been established in its second gear setting and the clutch reengaged the driver will then depress the accelerator to increase the speed of the vehicle; and the above described hold down relay operation of the relay 137 and cooperating switch 213 serves to control the motor 48 to maintain the second gear setting of the transmission so long as the accelerator is held depressed to maintain the switch 213 closed. Now when the speed of the vehicle exceeds the aforementioned critical speed of 15 M. P. H. the governor operated switch 180 is opened and when the accelerator is released to open the switch 213 there results a deenergization of the relay coil 174; and when this occurs the switches 144 and 175 are automatically opened and the switch 146 is automatically closed the latter operation effecting a closing of the electrical circuit including the solenoid 135. The latter solenoid is thus energized resulting in an operation of the valve 132 to effect a high gear operation of the motor 48; and said solenoid is deenergized by the opening of a transmission operated switch 222 when the high gear setting is established. As described above the friction clutch is, by the operation of the cam 34, disengaged to facilitate this high gear operation of the transmission; and it is to be added that the switch 222 is spring biased to a closed position when the transmission is established in any setting other than its high gear setting. It is also to be noted that to effect this high gear operation of the power means of my invention it is necessary to reverse the driving torque of the power plant; and this is accomplished by releasing the accelerator.

Now it follows that when the vehicle is again slowed down to the aforementioned 15 M. P. H. critical speed and the accelerator is released to reverse the torque the transmission will be automatically established in its second gear setting the friction clutch being automatically again operated to facilitate this operation.

An important feature of my invention lies in the incorporation of the fluid coupling 26, Figure 5, in the power plant; for the presence of this mechanism makes it possible to leave the transmission in its second gear setting when the vehicle is brought to a stop. Explaining this feature of my invention the inclusion of the fluid coupling, because of its so-called clutch slipping operation, makes it possible to (1) maintain an idling operation of the internal combustion engine without neutralizing the transmission and (2) to effect a smooth start of the vehicle with the transmission established in its second gear setting. It is also to be noted that the presence of the fluid coupling in the power plant facilitates the clutch engaging operation of the motor 48 in its cycle of operations; for said coupling, by virtue of its slipping clutch operation, obviates a stalling of the engine as the friction clutch is being engaged.

Referring again to the kickdown switch 176 it is to be remembered that the driver may, when the vehicle is travelling in high gear below the limit speed, that is at a speed to maintain the switch 178 closed, automatically effect the so-called kickdown that is second gear setting of the transmission, by depressing the accelerator beyond its full throttle open position to close said kickdown switch; and as described above the driver may, by certain operations of the selector switch 120, either neutralize the transmission by the operation of the motor 48 or establish the transmission in its second gear setting by an operation of said motor.

Describing now another feature of my invention it is of course desirable, to prevent an undesirable racing of the engine, to momentarily close the throttle 18 during the period of time that the friction clutch and transmission are being operated; and this is accomplished by an operation of the aforementioned throttle closing solenoid 204 disclosed in Figures 1 and 2. This solenoid is controlled by a relay mechanism 224 which includes a normally open switch 226 said switch being closed by one or the other of grounded relay solenoids 228 and 230 during the period of time that the motor 48 is energized to effect an operation of the clutch and transmission. As is disclosed in Figure 1 the grounded solenoid 228 is wired to the electrical connection interconnecting the valve operating solenoid 136 and relay 137; and the grounded solenoid 230 is wired to the electrical connection interconnecting the valve operated solenoid 135 and said relay. It is apparent therefore that the solenoid is operative to keep the throttle closed during the period of time required to operate the clutch and transmission. Describing this operation it will be noted by an examination of Figure 11 of the drawings, that when the solenoid 204 is energized the armature 202 moves to the left to rotate the crank 193 clockwise to close the throttle valve 18; and in this operation the member 192 slides over the rod end 189 the spring 206 being compressed.

There is thus provided, by the transmission, clutch and throttle operating mechanism of my invention in combination with an internal combustion engine, a friction clutch, a fluid coupling, a change-speed transmission and other standard parts, a power plant for an automotive vehicle requiring but a minimum of skill and effort for its effective control. The principal controls for said power plant consist of the accelerator, a manually operated clutch pedal and a manually operated shift lever preferably positioned beneath the steering wheel; and with the mechanism of my invention the operation of these controls is reduced to a minimum; for with a normal operation of the car the transmission is established in second gear when the vehicle is brought to a stop and when so established all that the driver need do to start the vehicle in motion is to depress the accelerator pedal. Thereafter the transmission automatically shuttles back and forth between second and high gear.

In other words, for a large portion of the driving operation the fluid coupling of the power plant cooperates with the power means for operating the throttle, clutch and transmission, accordingly, there is but a minimum of control demanded of the driver. The shift lever 72 at this time remains in its automatic position A and there is no operation of the clutch pedal necessary. It follows therefore that for this part of the operation of the car the accelerator and the brake pedal are the only controls operated by the driver.

Occasionally, of course, it is necessary to place the transmission in reverse gear and it is also occasionally necessary for the driver to establish the transmission in its low gear setting; and with these operations of the mechanism of my invention it is necessary to manually operate the clutch pedal the power means being at the time cut out of operation by virtue of the opening of the switch 116. At other times it is desirable to overrule the automatic operation of the power means of my invention either by neutralizing the transmission or by establishing the transmission in its second gear setting the latter operation being effected either by the above described kickdown operation of the accelerator or by a second gear operation of the shift lever 72.

It is thought that the invention and many of its attendant advantages will be understood from the foregoing description and it will be apparent that various changes may be made in the form, construction and arrangements of the parts without departing from the spirit and scope of the invention or sacrificing all of its material advantages, the forms hereinbefore described being merely preferred embodiments or alternatives thereof.

I claim:

1. In an automotive vehicle provided with a power plant comprising a fluid coupling, a friction clutch, a change-speed transmission and an internal combustion engine having a throttle valve; driver actuated and power operated mechanism for operating the throttle valve, the clutch and the transmission including a double-acting pressure differential operated motor for operating both the clutch and the transmission, the latter being power operated to establish the same in two of its relatively high gear ratio settings, driver actuated means for establishing the transmission either in its reverse gear setting or a relatively low gear ratio setting, and means for controlling the operation of the aforementioned mechanism including the accelerator of the vehicle, a driver actuated clutch pedal and a driver actuated gear shift lever.

2. In an automotive vehicle having a power plant comprising a fluid coupling, a friction clutch, a change-speed transmission and an internal combustion engine having a throttle valve; driver actuated and power operated mechanism for operating the throttle valve, the clutch and the transmission including a motor for operating the throttle valve, a double-acting pressure differential operated motor for operating both the clutch and the transmission, the latter being power operated to establish the same in two of its relatively high gear ratio settings, said operation of the motor being facilitated by the operation of the fluid coupling, driver actuated means for establishing the transmission either in its reverse gear setting or a relatively low gear ratio setting, and means for controlling the operation of the driver actuated and power operated mechanism including the accelerator of the vehicle, a driver actuated clutch pedal and a driver actuated gear shift lever.

3. In an automotive vehicle provided with a power plant including a fluid coupling, a friction clutch, a change-speed transmission and an internal combustion engine having a throttle valve; driver actuated and power operated mechanism for operating the clutch, the transmission and the throttle valve the latter being closed when the transmission is being power operated and the clutch being operated to facilitate the operation of the transmission, said means including driver actuated means for establishing the transmission either in a reverse gear setting or a relatively low gear setting, a motor for operating the throttle valve, a double-acting motor, and means interconnecting said motor with the transmission and the clutch for effecting a sequential operation of the clutch and transmission the operation of the latter serving to establish the same in one or the other of two relatively high gear ratio settings; and means for controlling the operation of the mechanism set forth above, including the accelerator of the vehicle, a driver actuated clutch pedal operative to facilitate the driver's actuation of the transmission, a vehicle speed responsive governor operative to facilitate the power operation of the clutch and transmission, and a gear shift lever constituting a common control for both the driver actuated part of the mechanism and the power means of said mechanism.

4. In an automotive vehicle provided with a power plant including a fluid coupling, a friction clutch, a change-speed transmission and an internal combustion engine having a throttle valve; driver actuated and power operated mechanism for operating the clutch, the transmission and the throttle valve the latter being closed when the transmission is being power operated and the clutch being operated to facilitate the operation of the transmission, said means including driver actuated means for establishing the transmission either in a reverse gear setting or a relatively low gear setting, a motor for operating the throttle valve, a double-acting motor, and means interconnecting said motor with the transmission and the clutch for effecting a sequential operation of the clutch and transmission the operation of the latter serving to establish the same in one or the other of two relatively high gear ratio settings; and means for controlling the operation of the mechanism set forth above, including the accelerator of the vehicle, a driver actuated clutch pedal operative to facilitate the driver's actuation of the transmission, a vehicle speed responsive governor for so controlling the operation of the second mentioned motor as to alternately effect the two aforementioned relatively high gear settings, and a gear shift lever selectively movable to any one of a plurality of control positions, said lever constituting a common control for both the driver actuated part of the mechanism and the power means of said mechanism.

5. In an automotive vehicle provided with a power plant comprising a fluid coupling, a friction clutch, a change speed transmission and an internal combustion engine having a throttle valve; driver actuated and power operated mechanism for operating the clutch, the transmission and the throttle valve the latter being closed when the transmission is being power operated, said means including a double-acting pressure differential operated motor operably connected to the transmission and clutch by means including a cam which serves to operate the clutch in timed relation to a certain power operation of the transmission, a motor for operating the throttle valve in a certain timed relation to the aforementioned power operation of the transmission and clutch, driver actuated means for effecting a certain operation of the transmission, and means for controlling the operation of the mechanism set forth above including the accelerator of the vehicle, a vehicle speed responsive governor operative to facilitate the power operation of the clutch and transmission, a driver actuated clutch pedal operative to facilitate the driver's actuation of the transmission and a gear shift lever constituting a common control for both the driver actuated part of the mechanism and the power means of said mechanism.

6. In an automotive vehicle provided with a power plant comprising a fluid coupling, a friction clutch, a change speed transmission and an internal combustion engine having a throttle valve; driver actuated and power operated mechanism for operating the clutch, the transmission and the throttle valve the latter being closed when the transmission is being power operated, said means including a double-acting pressure differential operated motor operably connected to the transmission and clutch by means including a cam which serves to operate the clutch in timed relation to a certain power operation of the transmission, a motor for operating the throttle valve in a certain timed relation to the aforementioned power operation of the transmission and clutch, driver actuated means, including force transmitting means mounted on the steering post of the vehicle, for effecting a certain operation of the transmission; and means for controlling the operation of the mechanism set forth above including the accelerator of the vehicle, a vehicle speed responsive governor constituting part of means for controlling the operation of the motor, a driver actuated clutch pedal operative to facilitate the driver's actuation of the transmission and a gear shift lever constituting a common control for both the driver actuated part of the mechanism and the power operated means of said mechanism.

7. In an automotive vehicle provided with a power plant comprising a friction clutch and a change speed transmission; driver actuated and power operated mechanism for operating the clutch and the transmission including a double-acting pressure differential operated motor for operating the clutch and for effecting either one of two gear ratio settings of the transmission, driver actuated means for effecting two other gear ratio settings of the transmission, and means for controlling the operation of said mechanism including the accelerator of the car, a driver actuated clutch pedal operative to facilitate the driver's actuation of the transmission, a gear shift lever positioned beneath the steering wheel of the vehicle constituting a common control for both the driver actuated part of the mechanism and the power means of said mechanism and electrical means for controlling the operation of said motor comprising an accelerator operated switch mechanism for effecting a down shift operation of the motor and further comprising a governor operated switch also operable to effect a down shift operation of said motor.

8. The combination with a friction clutch and a change speed transmission capable of being established in any one of three forward gear settings, a reverse gear setting or a neutral setting; of three cranks extending from the casing of the transmission, one of said cranks when operated serving to effect a shift rail selecting operation of the transmission, another of said cranks serving when actuated to effect either a low gear or a reverse gear operation of the transmission and the third of said cranks serving when operated to effect either a second gear or a high gear operation of the transmission, a pressure differential operated motor operably connected to the friction clutch and to the last mentioned crank and serving to effect a power operation of said crank to effect any one of a neutralizing operation of the transmission, a high gear operation or a second gear operation thereof, the clutch being operated incident to the operation of the transmission to facilitate the operation of the latter, valve means for controlling the operation of said motor, electrical means, including a three-position selector switch, for controlling the operation of said valve means and manually operated means, including a selector lever movable to five different control positions, for operating the first two mentioned cranks and for operating the selector switch mechanism.

9. In the power plant of an automotive vehicle the combination, with a friction clutch and a three-speeds forward and reverse change-speed transmission, of manually and power operated means for operating said clutch and transmission, said means comprising manually operated low and reverse gear operating means extending from the casing of the transmission, manually operated shift rail selecting means extending from the casing of the transmission, power operated second and high gear operating means also extending from the casing of the transmission, a double-acting motor operably connected with the latter means and with the clutch, valve means for controlling the operation of said motor, electrical means, including a selector switch mechanism, for controlling the operation of said valve means and manually operated force transmitting means for operating the selector switch mechanism and the two first-mentioned means; the parts of the power and manually operated means being so constructed and arranged and so operative that the rail selecting operating means may be operated only after the second and high gear power operated means is placed in its transmission neutral position and the parts of said power and manually operated means being also so constructed and arranged and so operative that the aforementioned low and reverse gear operating means is inoperative to effect either a reverse or low gear operation of the transmission as long as the second and high gear power operated means is operative to effect any one of a neutralization of the transmission, a second gear operation of the transmission or a high gear operation thereof.

10. In the power plant of an automotive vehicle said plant including a change-speed transmission and friction clutch; power and driver actuated means for effecting an operation of said clutch and also effecting any one of six operations of said transmission, that is, any one of a shift rail selecting operation, a transmission neutralizing operation, a low gear operation, a reverse gear operation, a second gear operation, and a high gear operation; said power and driver actuated means comprising a double-acting pressure differential operated motor which is at times operably connected to the clutch and which is also operably connected to that part of the transmission mechanism operable to establish the same in either one or the other of the aforementioned last two settings of the transmission, valve means for controlling the operation of said motor, electrical means, including a driver actuated selector switch mechanism, for controlling the operation of said valve means and driver actuated means, including a selector lever and a clutch pedal, for at times operating the friction clutch, for operating the selector switch mechanism and for effecting, by the physical effort of the driver, either a relatively low gear ratio setting of the transmission or a reverse gear setting thereof.

11. In the power plant of an automotive vehicle said plant including a change-speed transmission and friction clutch; power and driver actuated means for effecting an operation of said clutch and also effecting any one of six operations of said transmission, that is, any one of a shift rail selecting operation, a transmission neutralizing operation, a low gear operation, a reverse gear operation, a second gear operation, and a high gear operation; said power and driver actuated means comprising a double-acting pressure differential operated motor which is at times operably connected to the clutch and which is also operably connected to that part of the transmission mechanism operable to establish the same in either one or the other of the aforementioned last two settings of the transmission, valve means for controlling the operation of said motor, electrical means, including a driver actuated selector switch mechanism and further including an accelerator operated kickdown switch mechanism and an accelerator operated holddown relay mechanism, for controlling the operation of said valve means and driver actuated means, including a selector lever and a clutch pedal, for at times operating the friction clutch, the selector switch mechanism and for effecting, by the physical effort of the driver, either a relatively low gear ratio setting of the transmission or a reverse gear setting thereof.

12. In the power plant of an automotive vehicle, said plant including a change-speed transmission and a friction clutch, power and manually operated means for effecting an operation of said clutch and also effecting any one of six operations of said transmission, that is any one of a shift rail selecting operation, a transmission neutralizing operation, a low gear operation, a reverse gear operation, a second gear operation or a high gear operation; said means comprising a manually operated rail selecting crank extending from the casing of the transmission, a manually operated low and reverse gear operating crank extending from the casing of the transmission, a power operated second gear, transmission neutralizing and high gear operating crank extending from the casing of the transmission, a double-acting pressure differential operated motor operably connected to the clutch and to the latter crank, valve means for controlling the operation of said motor, electrical means, including a manually operated selector switch mechanism, for controlling the operation of said valve means, said switch mechanism being actuated concurrently with the operation of the second-mentioned crank, and force transmitting means, including a manually operated shift lever, for operating the latter switch mechanism and the first two mentioned cranks, the parts of the aforementioned clutch and transmission operating mechanism being so constructed and arranged and so operative that the transmission must be neutralized before the rail selecting operating crank may be actuated, said parts of the mechanism being also so constructed and arranged and so operative that the selector switch is inoperative to control the valve mechanism when the second-mentioned crank is being manually operated to establish the transmission in either its low gear or its reverse gear setting.

13. In the power plant of an automotive vehicle, said plant including a change-speed transmission and a friction clutch, power and manually operated means for effecting an operation of said clutch and also effecting any one of six operations of said transmission, that is any one of a shift rail selecting operation, a transmission neutralizing operation, a low gear operation, a reverse gear operation, a second gear operation or a high gear operation; said means comprising a manually operated shift rail selecting crank extending from the casing of the transmission, a manually operated low and reverse gear operating crank extending from the casing of the transmission, a power operated second gear, transmission neutralizing and high gear operating crank extending from the casing of the transmission, a double-acting pressure differential operated motor operably connected to the clutch and to the latter crank, the connection with the clutch being effected by force transmitting means including a laterally movable power operated crank which serves to make possible a power operation of the clutch only when the aforementioned pressure differential operated motor is operative to operate the transmission, valve means for controlling the operation of said motor, electrical means, including a manually operated selector switch mechanism, for controlling the operation of said valve means, said switch mechanism being actuated concurrently with the operation of the second-mentioned crank, and force transmitting means, including a manually operated shift lever, for operating the latter switch mechanism and the first two mentioned cranks, the parts of the aforementioned clutch and transmission operating mechanism being so constructed and arranged and so operative that the transmission must be neutralized before the shift rail selecting operating crank may be actuated, said parts of the mechanism being also so constructed and arranged and so operative that the selector switch is inoperative to control the valve mechanism when the second-mentioned crank is being manually operated to establish the transmission in either its low gear or its reverse gear setting.

14. In an automotive vehicle having a power plant comprising a three speeds forward and reverse transmission, an engine controlling throttle and a friction clutch; power and driver actuated means for operating the transmission and for operating the clutch to facilitate the operation of the transmission, said means comprising driver actuatable means for effecting, by the physical effort of the driver, the low gear and reverse gear settings of the transmission, power actuated means serving when actuated to, in one cycle of operations, disengage the clutch and effect one or the other of the second or high gear settings of the transmission, and then reengage the clutch, pressure differential operated power means for actuating said power actuated means, and means for controlling the operation of the entire power and driver actuated means including a driver actuated shift lever serving as a control member to effect any one of the four settings of the transmission, a vehicle speed responsive governor for controlling the operation of the pressure differential operated power means, a driver actuated clutch pedal for disengaging the clutch to facilitate the operation of effecting either the low gear or reverse gear settings of the transmission, and a driver actuated throttle controlling member operable as a control member in effecting the second and high gear operations of the transmission.

15. Power and manually operated means for operating a three speeds forward and reverse change speed transmission of the power plant of an automotive vehicle and for operating the friction clutch of said plant to facilitate the operation of said transmission, said means comprising manually operable means serving, when actuated, to establish the transmission in either its low gear setting or its reverse gear setting, power actuated means serving, when actuated, to effect, in a cycle of operations, a disengagement of the clutch and either a second gear or high gear operation of the transmission followed by a re-engagement of the clutch, pressure differential operated means for actuating the power actuated means, and means for controlling the operation of the entire power and manually operated means comprising the gear shift lever of the power plant of the vehicle, the throttle controlling accelerator of said power plant, and a vehicle speed responsive governor, the parts of the mechanism being so constructed and arranged and so operative that the cycle of operations of the clutch and transmission operating power means is initiated by establishing each of said three controls in a certain setting.

16. In an automotive vehicle provided with a three speeds forward and reverse transmission and a friction clutch, power and driver actuated means for operating said clutch and transmission including driver actuated means for effecting either a reverse gear or a low gear setting of the transmission and for operating the clutch to facilitate said operations of the transmission, power operated means for effecting either a second gear setting of the transmission or a high gear setting thereof and for operating the clutch to facilitate the latter operations of the transmission, including a pressure differential operated motor for operating both the clutch and transmission, and means for controlling the operation of said power operated means including a gear shift lever operated switch means, a vehicle speed responsive governor, and switch means operated by said governor.

17. In an automotive vehicle provided with a three speeds forward and reverse transmission and a friction clutch, power and driver actuated means for operating said clutch and transmission including driver actuated means for effecting either a reverse gear or a low gear setting of the transmission and for operating the clutch to facilitate said operations of the transmission, power operated means for successively effecting, in one cycle of operations, a disengagement of the clutch, either a second gear or high gear operation of the transmission, and a re-engagement of the clutch including a pressure differential operated motor for operating both the clutch and transmission, and means for controlling the operation of said power operated means including a gear shift lever operated switch means, a vehicle speed responsive governor, and switch means operated by said governor.

18. Power and manually operated mechanism for operating a three speeds forward and reverse transmission of the power plant of an automotive vehicle and for operating the friction clutch of said power plant to facilitate said operation of the transmission, said mechanism comprising transmission operating means extending from the casing of the transmission, clutch operating means operably connected to the clutch, force transmitting means connected to said transmission operating means and clutch operating means, said force transmitting means being in part manually operable to effect either a low gear or a reverse gear setting of the transmission and to operate the clutch to facilitate said operations of the transmission, and being in part power operated to disengage the clutch and operate the transmission to establish the same in either its second gear setting or its high gear setting, and then re-engage the clutch all in one cycle of operations, pressure differential operated means for effecting the power operation of the force transmitting means, and means for controlling the operation of the entire power and manually operated mechanism including a manually operated gear shift lever and an accelerator, both of said controls being operable to control the mechanism in its operation to effect any one of the four settings of the transmission, said control means further including a vehicle speed responsive governor operable as part of the means for controlling the pressure differential operated means.

19. Power and manually operated mechanism for operating a three speeds forward and reverse transmission of the power plant of an automotive vehicle and for operating the friction clutch of said power plant to facilitate said operation of the transmission, said mechanism comprising transmission operating means extending from the casing of the transmission, clutch operating means operably connected to the clutch, force transmitting means connected to said transmission operating means and clutch operating means, said force transmitting means being in part manually operable to effect either a low gear or a reverse gear setting of the transmission and to operate the clutch to facilitate said operations of the transmission, and being in part power operated to disengage the clutch and operate the transmission to establish the same in either its second gear setting or its high gear setting, and then re-engage the clutch all in one cycle of operations, a pressure differential operated motor for effecting the power operation of the force transmitting means, and means for controlling the operation of the entire power and manually operated mechanism including a manually operated gear shift lever and an accelerator, both of said controls being operable to control the mechanism in its operation to effect any one of the four settings of the transmission, said control means further including a vehicle speed responsive governor operable as part of the means for controlling the pressure differential operated motor.

20. In an automotive vehicle provided with a power plant including a three speeds forward and reverse transmission, a friction clutch, and a fluid coupling; power and manually operated means for operating the transmission and for operating the clutch to facilitate the operation of the transmission, including manually operable means for effecting either a low gear or a reverse gear operation of the transmission, power means for successively disengaging the clutch, establishing the transmission either in its second gear setting or its high gear setting and re-engaging the clutch, the latter operation being facilitated by an operation of the fluid coupling, means for controlling the operation of said power and manually operated means including a gear shift lever operable as part of the controls for effecting any one of the four settings of the transmission and further including a vehicle speed responsive governor for in part controlling the operation of the power means.

21. In an automotive vehicle provided with a power plant including a three speeds forward and reverse transmission, a friction clutch, and a fluid coupling; power and driver actuated means for operating the transmission and for operating the clutch to facilitate the operation of the transmission, said means including driver actuated means for effecting either a low gear or a reverse gear operation of the transmission and also including a pressure differential operated motor operable to successively disengage the clutch, establish the transmission either in its second gear setting or its high gear setting and re-engage the clutch the latter operation being facilitated by an operation of the fluid coupling, means for controlling the operation of said power and driver actuated means including a gear shift lever operable as part of the controls for effecting any one of the four settings of the transmission and further including a vehicle speed responsive governor for in part controlling the operation of the pressure differential operated motor.

22. In an automotive vehicle provided with a power plant including a friction clutch and a three speeds forward and reverse transmission; driver actuated and power operated mechanism for operating the transmission and for operating the clutch to facilitate said operation of the transmission, said mechanism including pressure differential operated means for effecting, in a cycle of operations, a disengagement of the clutch and an operation of the transmission to establish the same in either its high gear setting or its second gear setting followed by a re-engagement of the clutch; and means for controlling the operation of said driver actuated and power operated mechanism including a vehicle speed responsive governor operative to control the pressure differential operated means, a switch mechanism actuated by said governor, a gear shift lever constituting a common control for both the pressure differential operated means and the driver actuated means of the power and driver actuated mechanism and a selector switch mechanism actuated by the shift lever.

23. In an automotive vehicle provided with a power plant including an engine controlling throttle, an accelerator for operating the throttle, a friction clutch, a fluid coupling, and a three speeds forward and reverse transmission; driver actuated and power operated mechanism for operating the transmission and for operating the clutch to facilitate said operation of the transmission, said mechanism including a pressure differential operated motor for effecting, in a cycle of operations, a disengagement of the clutch, an operation of the transmission to establish the same in either its high gear setting or its second gear setting, and a re-engagement of the clutch the operation of the fluid coupling facilitating the latter operation, and means for controlling the operation of said driver actuated and power operated mechanism including a vehicle speed responsive governor operative to control the pressure differential operated means, a switch mechanism actuated by said governor, a gear shift lever constituting a common control for both the pressure differential operated means and the driver actuated means of the manually and power operated mechanism and a selector switch mechanism actuated by said lever, the parts of said mechanism being so constructed and arranged and so operative that the aforementioned cycle of operations is effected after the accelerator is released and the shift lever operated and governor operated switches are closed.

24. In an automotive vehicle provided with a change speed transmission, a friction clutch, and an accelerator; power and driver actuated mechanism for operating the clutch and transmission including pressure differential operated means for effecting a shuttling operation of the transmission between two of its settings and for operating the friction clutch to facilitate said operations of the transmission, each of said operations of the transmission and clutch including a cycle of operations, namely a disengagement of the clutch and an operation of the transmission and a re-engagement of the clutch; followed by means for controlling the operation of said power and driver actuated mechanism including valve means for controlling the operation of the pressure differential operated means, a vehicle speed responsive governor operative to control the pressure differential operated means, switch mechanism actuated by said governor, a driver actuated gear shift lever constituting a common control for both the pressure differential operated means and the driver actuated means for the power and driver actuated mechanism and a selector switch actuated by said shift lever; the parts of said mechanism being so constructed and arranged and so operative that the aforementioned cycle of operations is effected after the shift lever is operated and governor operated switches are closed and the accelerator is released.

25. Manually and power operated mechanism adapted to operate a three speeds forward and reverse transmission of the power plant of an automotive vehicle and to operate a clutch of the power plant to facilitate the operation of the transmission including power means, comprising pressure differential operated motor means, for shuttling the transmission between its second and high gear settings and for automatically disengaging and re-engaging the clutch to facilitate said operations of the transmission; manually and power operated means for establishing the transmission in either low or reverse gear, for effecting a rail selecting operation of the transmission, and for disconnecting the hereinafter referred to gear shift lever from the transmission preparatory to effecting a power operation thereof; and means for controlling the operation of the manually and power operated mechanism including valve means for controlling the operation of the pressure differential operated motor means, means for controlling the operation of the valve means including a vehicle speed responsive governor and switch means operated by the governor and constituting part of the means for controlling the power means; the control means for the mechanism further including a gear shift lever constituting a common control for both the pressure differential operated motor means and the manually operated portion of the mechanism, the parts of said mechanism being so constructed and arranged and so operative that the power operation of the transmission and clutch to effect the aforementioned shuttling operation is made possible only after the shift lever is placed in a certain position.

26. In an automotive vehicle provided with a power plant including a throttle controlling accelerator, a friction clutch, and a three speeds forward and reverse change speed transmission; manually and power operated mechanism for operating the clutch and the transmission including pressure differential operated motor means for operating the transmission to successively establish the same in two relatively high gear ratio settings, the clutch being automatically disengaged and re-engaged to facilitate this operation of the transmission, valve means for controlling the operation of said motor means, manually operated means for establishing the transmission either in its reverse gear setting or a relatively low gear ratio setting; and means for controlling the operation of the clutch and transmission operating mechanism including electrical means for controlling the operation of the valve means, said electrical means including, in series, a battery, a manually operated selector switch operative to effect one or the other of the aforementioned relatively high gear ratio settings, and a governor operated switch; together with an accelerator operated kick-down switch electrically connected in parallel with the governor operated switch and operative, with a certain operation of the accelerator, to overrule the governor operated switch and thereby effect the lower of the two relatively high gear ratio settings of the transmission.

GEORGE AINSWORTH.

REFERENCES CITED

The following references are of record in the file of this patent:

UNITED STATES PATENTS

| Number | Name | Date |
|---|---|---|
| 2,261,898 | Barkeij | Nov. 4, 1941 |
| 2,263,400 | Schwarz | Nov. 18, 1941 |
| 2,287,272 | Price, et al. | June 23, 1942 |
| 2,292,253 | Thurber | Aug. 4, 1942 |
| 2,296,290 | Mayrath | Sept. 22, 1942 |
| 2,328,921 | Neff | Sept. 7, 1943 |
| 2,348,435 | Hey et al. | May 9, 1944 |
| 2,425,889 | Matulaitis | Aug. 19, 1947 |
| 2,434,717 | Randol | Jan. 20, 1948 |